United States Patent
Fabbrizio et al.

(10) Patent No.: US 8,804,694 B2
(45) Date of Patent: Aug. 12, 2014

(54) METHOD AND APPARATUS FOR INVOKING MULTIMODAL INTERACTION IN A VOIP CALL

(75) Inventors: Giuseppe Di Fabbrizio, Florham Park, NJ (US); Narendra K. Gupta, Dayton, NJ (US); Benjamin J. Stern, Morris Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 818 days.

(21) Appl. No.: 11/450,022

(22) Filed: Jun. 8, 2006

(65) Prior Publication Data

US 2007/0286162 A1 Dec. 13, 2007

(51) Int. Cl.
*H04L 12/66* (2006.01)
*H04M 11/00* (2006.01)

(52) U.S. Cl.
USPC ........... 370/352; 370/353; 370/354; 370/355; 370/356; 379/88.18

(58) Field of Classification Search
USPC ................. 370/395.2; 455/522.1; 379/202.01
See application file for complete search history.

(56) References Cited

U.S. PATENT DOCUMENTS

| | | | |
|---|---|---|---|
| 6,266,405 B1 * | 7/2001 | Madour et al. | 379/220.01 |
| 6,337,858 B1 * | 1/2002 | Petty et al. | 370/356 |
| 7,366,183 B1 * | 4/2008 | Sylvain | 370/395.61 |
| 7,471,671 B2 * | 12/2008 | Xiong et al. | 370/352 |
| 8,041,019 B2 * | 10/2011 | Pieraccini et al. | 379/209.01 |
| 8,126,121 B2 * | 2/2012 | Parolkar et al. | 379/88.17 |
| 8,139,560 B2 * | 3/2012 | Hynonen et al. | 370/352 |
| 8,532,267 B1 * | 9/2013 | Gupta et al. | 379/88.01 |
| 2001/0032270 A1 * | 10/2001 | Koo | 709/237 |
| 2002/0114318 A1 * | 8/2002 | Rines | 370/352 |
| 2002/0141404 A1 * | 10/2002 | Wengrovitz | 370/389 |
| 2004/0032862 A1 * | 2/2004 | Schoeneberger et al. | 370/352 |
| 2004/0052245 A1 * | 3/2004 | Kwon | 370/352 |
| 2004/0120498 A1 * | 6/2004 | Sylvain | 379/221.01 |
| 2004/0180689 A1 * | 9/2004 | Nayak | 455/552.1 |

(Continued)

FOREIGN PATENT DOCUMENTS

EP 1424824 A 6/2004
EP 1850619 A1 * 10/2007 ............... H04Q 7/38

(Continued)

OTHER PUBLICATIONS

M. Handley, H. Schulzrinne, E. Schooler, and J. Rosenberg, "SIP: session initiation protocol," Request for Comments (Proposed Standard) 2543, Internet Engineering Task Force, Mar. 1999. p. 27-28.*

(Continued)

*Primary Examiner* — Marsha D Banks Harold
*Assistant Examiner* — Christopher Wyllie (57) ABSTRACT

In one example, handling a call at a first client device in a packet network is described. The first client device obtains device capabilities of a second client device in response to the call. The device capabilities are processed to determine whether the second client device is capable of graphical display or graphical interaction. If so, the first client device follows a multimodal call flow. Otherwise, the first client device follows a voice-only call flow.

3 Claims, 4 Drawing Sheets

(56) References Cited

U.S. PATENT DOCUMENTS

| | | | |
|---|---|---|---|
| 2005/0041603 A1* | 2/2005 | Tighe et al. | 370/260 |
| 2005/0058075 A1* | 3/2005 | Gorday et al. | 370/241 |
| 2005/0099996 A1* | 5/2005 | Monai et al. | 370/352 |
| 2005/0190746 A1* | 9/2005 | Xiong et al. | 370/352 |
| 2005/0212908 A1* | 9/2005 | Rodman et al. | 348/14.08 |
| 2006/0047840 A1* | 3/2006 | Postmus | 709/230 |
| 2006/0056416 A1* | 3/2006 | Yang et al. | 370/395.2 |
| 2006/0067249 A1* | 3/2006 | Poustchi et al. | 370/260 |
| 2006/0227785 A1* | 10/2006 | Cournut et al. | 370/392 |
| 2006/0294242 A1* | 12/2006 | Ozaki et al. | 709/227 |
| 2007/0002840 A1* | 1/2007 | Song et al. | 370/352 |
| 2007/0036327 A1* | 2/2007 | Button | 379/265.01 |
| 2007/0058794 A1* | 3/2007 | Abrol et al. | 379/202.01 |
| 2007/0097879 A1* | 5/2007 | Bleckert et al. | 370/254 |
| 2007/0280218 A1* | 12/2007 | Stern et al. | 370/356 |
| 2014/0011544 A1* | 1/2014 | Gupta et al. | 455/563 |

FOREIGN PATENT DOCUMENTS

| | | | | |
|---|---|---|---|---|
| WO | WO-2005/027460 | | 3/2005 | |
| WO | WO 2006/038839 | * | 4/2006 | H04M 3/54 |
| WO | WO 2006038839 A1 | * | 4/2006 | H04M 3/54 |

OTHER PUBLICATIONS

Subsystem (IMS) Sessions: Stage 2 (3GPP TS 23.279 version 7.2.0 Release 7); 3GPP TS 23.279, ETSI Standards, European Telecommunications Standards Institute, Sophia, Antipo, FR, vol. 3-SA1, No. V710, Dec. 2005.
International Search Report and Written PCT/US2007/070261.
Copy of Office Action from CA 2,653,930, Mar. 8, 2011, copy consists of 2 pages.
Copy of Notification of Transmittal of International Preliminary Report on Patentability for PCT/US07/70261, Jul. 9, 2012, copy consists of 7 unnumbered pages.

* cited by examiner

METHOD AND APPARATUS FOR INVOKING MULTIMODAL INTERACTION IN A VOIP CALL

BACKGROUND OF THE INVENTION

1. Field of the Invention

Embodiments of the present invention generally relate to telecommunications systems and, more particularly, to a method and apparatus for invoking multimodal interaction in a voice-over internet protocol (VOIP) call.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

In a VOIP network, voice conversations are routed over the Internet or through any other internet protocol (IP)-based network. The voice data flows over a general-purpose packet-switched network, rather than dedicated legacy circuit-switched telephony transmission lines. VOIP calls can be launched from devices that have interactive capabilities well beyond simple voice transmit/receive. Such devices include personal computers (PCs), personal digital assistants (PDAs), mobile phones with displays, and the like. In some cases, it is desirable to utilize these interactive capabilities of such devices during a VOIP call. Conventionally, however, a receiving device is not aware that the calling device is capable of such interactive capabilities. Accordingly, there exists a need in the art for a method and apparatus for invoking multimodal interaction in a VOIP call.

SUMMARY OF THE INVENTION

Method and apparatus for invoking multimodal interaction in a VOIP call is described. In one embodiment, handling a call at a first client device in a packet network is described. The first client device obtains device capabilities of a second client device in response to the call. The device capabilities are processed to determine whether the second client device is capable of graphical display or graphical interaction. If so, the first client device follows a multimodal call flow. Otherwise, the first client device follows a voice-only call flow.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
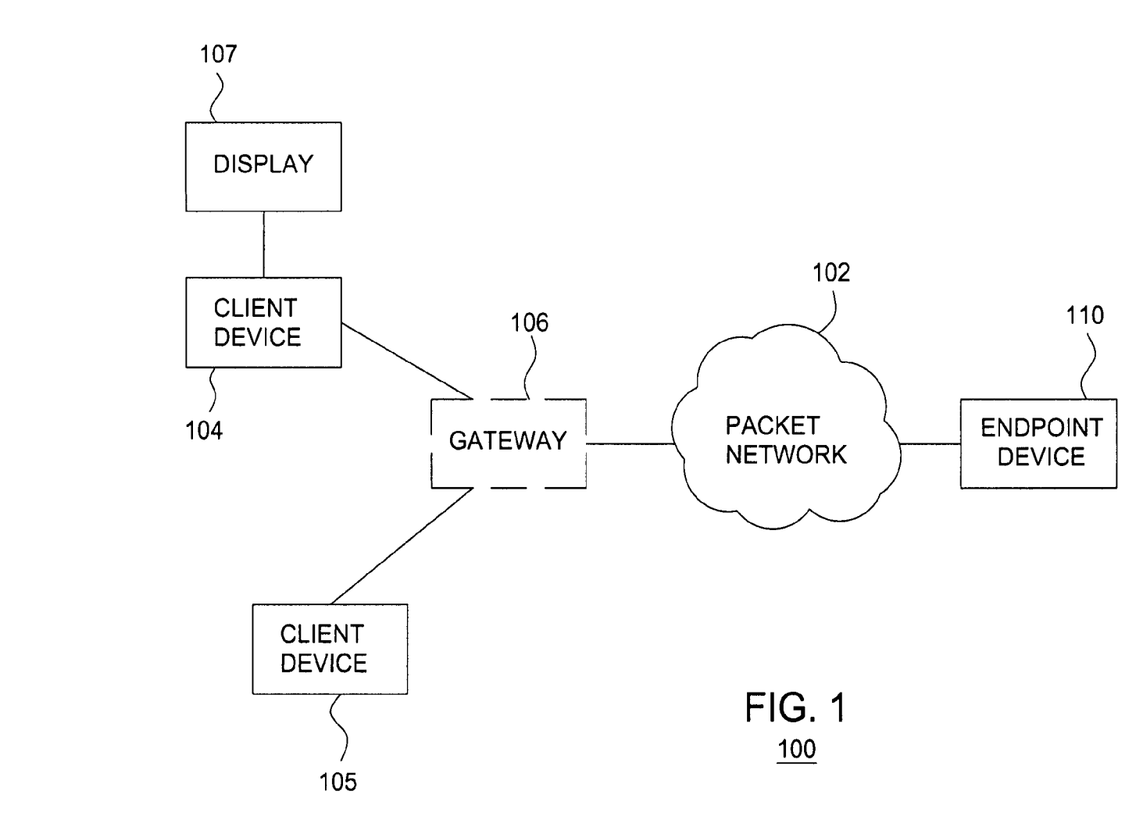
FIG. 1 is a block diagram depicting an exemplary embodiment of a communication system.

FIG. 1 is a block diagram depicting an exemplary embodiment of a communication system 100. The communication system 100 includes a packet network 102, client devices 104 and 105, and an endpoint device 110. The packet network 102 may comprise one or more of an internet protocol (IP) network, asynchronous transfer mode (ATM) network, frame relay network, and the like. A packet network is broadly defined as a network that uses a protocol, such as IP, to exchange data packets. Thus, a voice-over-internet protocol (VOIP) network, or a SOIP (Service over internet protocol) network is considered a packet network. In one embodiment, the packet network 102 may include an Internet Protocol/Multi-Protocol Label Switching (IP/MPLS) based core backbone network for supported VOIP services. Broadly defined, a VOIP network is a network that is capable of carrying voice signals as packetized data over an IP network. The present invention is described below in the context of an illustrative VOIP network. Thus, the present invention should not be interpreted to be limited by this particular illustrative architecture. An exemplary VOIP or SOIP communication system is described below with respect to FIG. 4.

The client devices 104 and 105 are configured to VOIP communication through the packet network 102. Illustratively, the client device 104 comprises an IP based client coupled to a display 107. For example, the client device 104 may comprise an IP phone, personal computer (PC), personal digital assistant (PDA), and like type device capable of displaying images on a display. The client device 105 may be either time division multiplexing (TDM) based or IP based. TDM-based clients typically comprise TDM phones or the like. Notably, the client device 105 is not capable of displaying images on a display and is not coupled to a display.

In some cases, the client device 104 and/or the client device 105 may be directly coupled to the packet network. For example, the client devices may include modems (not shown) for interfacing the packet network 102. In other cases, the client device 104 and/or the client device 105 may be coupled to the packet network 102 through a gateway 106. The gateway 106 is used to provide the necessary internetworking functions between the client device 104 and/or the client device 105 and the packet network 102. The gateway 106 comprises, for example, a router, access point, or the like. Although only two client devices are shown, it is to be understood that a plurality of client devices may be served by the gateway 106.

The endpoint device 110 may comprise an IP-based client like the client 104 or a more complex system, such as an interactive voice response (IVR) system, for example, an IVR catalog ordering application, or the like. It is to be understood that the endpoint device 110 may be any type of device or system of which IVR is just an example.

Figure 2:
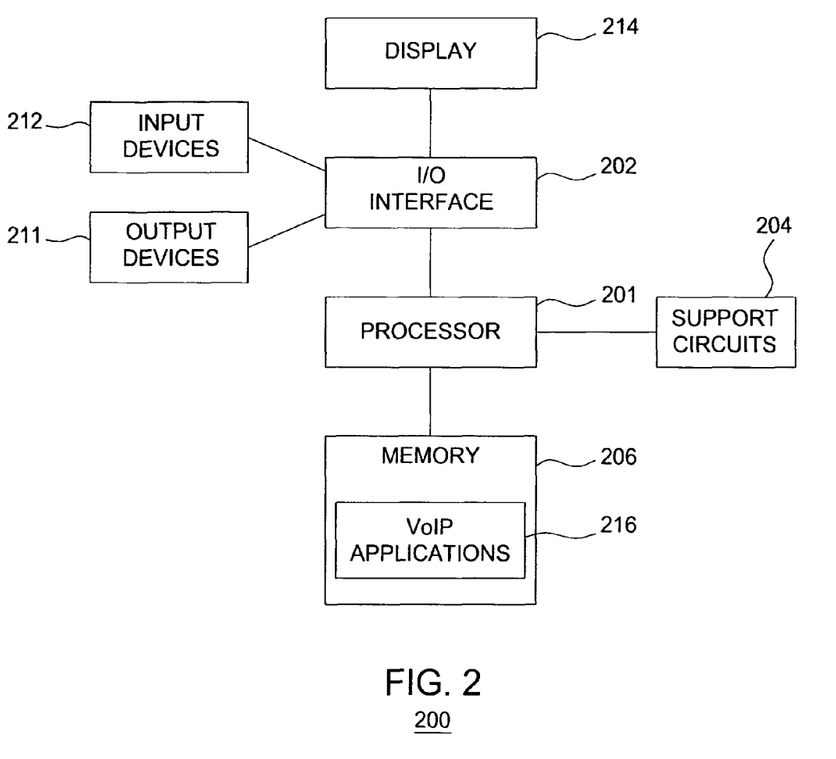
FIG. 2 is a block diagram of a network element constructed in accordance with one or more aspects of the invention.

FIG. 2 is a block diagram of a network element 200 constructed in accordance with one or more aspects of the invention. The client device 104 and the endpoint device 110 may each be constructed identically to or similar to the network element 200. The network element 200 may be used to implement the client device 104 or the endpoint device of FIG. 1. The network element 200 includes a processor 201, a memory 206, various support circuits 204, and an I/O interface 202. The processor 201 may be any type of microprocessor known in the art. The support circuits 204 for the processor 201 include conventional cache, power supplies, clock circuits, data registers, I/O interfaces, and the like. The I/O interface 202 may be directly coupled to the memory 203 or coupled through the processor(s) 201. In one embodiment, the I/O interface 202 may be coupled to various input devices 212 and output devices 211, such as a conventional keyboard, mouse, printer, and the like. The I/O interface 202 is further coupled to a display 214.

The memory 203 stores processor-executable instructions and/or data that may be executed by and/or used by the processor 201 as described further below. These processor-executable instructions may comprise hardware, firmware, software, and the like, or some combination thereof. Modules having processor-executable instructions that are stored in the memory 203 include VOIP application 216. The functions performed by the client device 104 and/or the endpoint device 110 described above may be implemented by the VOIP application 216. The memory 203 may include one or more of the following random access memory, read only memory, magneto-resistive read/write memory, optical read/write memory, cache memory, magnetic read/write memory, and the like, as well as signal-bearing media as described below.

Although one or more aspects of the invention are disclosed as being implemented as processor(s) executing a software program, those skilled in the art will appreciate that the invention may be implemented in hardware, software, or a combination of hardware and software. Such implementations may include a number of processors independently executing various programs and dedicated hardware, such as ASICs. In one embodiment, the network element 200 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 203.

Referring to FIGS. 1 and 2, in one embodiment, discovery of a calling device's capabilities is provided for automatic invocation of multimodal interactions during VOIP calls. For purposes of clarity by example, assume the client devices 104 and 105 are calling devices and the endpoint device 110 is receiving the calls (i.e., the receiving device). In response to a call request from a client device, the VOIP application 216 on the endpoint device 110 is configured to obtain device capabilities of the calling device. In one embodiment, the VOIP application 216 on the calling device is configured to send its device capabilities during call setup. For example, for session initiation protocol (SIP) based VOIP, the calling device may send its device capabilities as part of a capabilities announcement in the INVITE method that sets up the call. In another embodiment, the VOIP application 216 on the endpoint device 110 is configured to request the device capabilities after the call is established. For example, for SIP based VOIP, the calling device may send the device capabilities in an INFO method. While SIP is described as an example, those skilled in the art will appreciate that device capabilities can be sent from the calling device to the endpoint device using other types of VOIP protocols either during call setup or after the call has been established, such as other standard VOIP protocols (e.g., H.323) or other proprietary VOIP protocols (e.g., SKYPE protocol). In yet another embodiment, the calling device may send the device capabilities to the endpoint device via a separate control channel parallel to the call either on its on initiative or in response to a request from the endpoint device 110.

The device capabilities include information indicative of whether the calling device is configured to graphical display or graphical interaction. For example, the calling device may be coupled to a display capable of showing images to a user ("graphical display"). Graphical display includes the display of static images, as well as video (e.g., a moving sequence of images). The term "image" is meant to include any type of data capable of display, such as graphics, text, or any combination thereof. In some cases, the calling device may be capable of interaction in addition to graphical display ("graphical interaction"). For example, the calling device may implement a graphical user interface (GUI). Again, graphical interaction includes the display of and interaction with static images, as well as video.

For example, assume the client device 104 places a call to the endpoint device 110. The endpoint device 110 receives a call request from the client device 104. In response to the call request, the endpoint device 110 obtains the device capabilities of the client device 104. As discussed above, the device capabilities may be sent by the client device 104 on its own initiative or in response to a request from the endpoint device 110 either during call setup or after a call has been established. If a call is first established, the endpoint device 110 may assume the client device 104 is capable of voice-only interaction and thus a voice-only call is established. The endpoint device 110 processes the device capabilities and determines that the client device 104 is capable of graphical display. The endpoint device 110 then follows a multimodal call flow rather than a voice-only call flow. For example, the endpoint device 110 may send image data towards the client device 104 for display. The image data may include static images, video, text, or a combination thereof.

The image data may represent an advertisement, a visual response to a request from the client device 104, or any of a myriad of possible images. For example, a user of the client device 104 may request current mortgage rates (e.g., the endpoint device 110 may be a bank IVR). The endpoint device 110 responds by playing a voice prompt that lists rates for different types of mortgages, while at the same time sending an image consisting of a visual table with the same information. In another example, the endpoint device 110 may be a telephone-order IVR and a user of the client device 104 may be ordering an article of clothing. The endpoint device 110 may send a picture of the item being order and may also play a verbal confirmation. In yet another example, if the client device 104 is capable of graphical interaction, the endpoint device 110 may send an interactive form (e.g., a hypertext markup language (HTML) form) to the client device 104. The interactive form may be configured to solicit name and address information from the user. Those skilled in the art will appreciate that the invention may be used in a myriad of different applications in addition to those described above.

The endpoint device 110 may send the image data or interactive image data to the client device using the VOIP protocol or through a separate control channel. For example, the image data or interactive image data may be sent in a SIP INFO method. In the case of interactive image data, the client device 104 may send data indicative of a response to the endpoint device 110 using the VOIP protocol (e.g., SIP INFO method) or through a separate control channel.

If the endpoint device 110 receives a call request from the client device 105, the endpoint device 110 determines that the client device 105 is not capable of either graphical display or graphical interaction. Thus, the endpoint device 110 follows a voice-only call flow. In the voice-only call flow, the endpoint device 110 does not send any image data or interactive image data to the client device 105, but rather interacts by voice alone. Notably, the voice prompts played during the voice-only call flow may differ from those played during the multimodal call flow. Since image data or interactive image data is sent during the multimodal call flow, less voice prompting and/or less detailed voice prompting may be needed. Since there is no image data or interactive image data in the voice-only call flow, more voice prompting and/or more detailed voice prompting may be required.

Although the above examples describe the endpoint device 110 as being an IVR system, it is to be understood that the endpoint device 110 may comprise other types of devices. For example, the endpoint device 110 may comprise an IP-based client, such as a PC, supporting a customer service representative (CSR). A fully bi-directional multimodal interaction can be engaged, where the CSR is able to push multimedia content to the calling device and vice versa. For example, the CSR may choose to visually display a copy of a letter previously sent to the caller. In another example, the endpoint device 110 may comprise a VOIP-capable handheld device. Depending on the capabilities of the device placing a phone call to the endpoint device 110, the endpoint device 110 can vary its call flow for announcing and presenting a call. It may, for example, bring up a digital photo album icon and offer to send pictures from the album to the caller as part of the conversation.

In the above described example, it is assumed that the client devices 104 and 105 are the calling devices and the endpoint device 110 is the receiving device. It is to be understood that the invention may be used in reverse direction, that is, when the endpoint device 110 is the calling device and the client devices 104 and 105 are the receiving devices. Moreover, in the above described example, it is assumed that the receiving device (i.e., the endpoint device 110) obtains the device capabilities of the calling device (i.e., the client device 104 or 105) and modifies its call flow in response thereto. It is to be understood that the invention may also be employed such that the calling device obtains the device capabilities of a receiving device. In general, any client device coupled to the packet network may be configured to obtain device capabilities of another client device associated with a call and to modify a call flow in response thereto.

Figure 3:
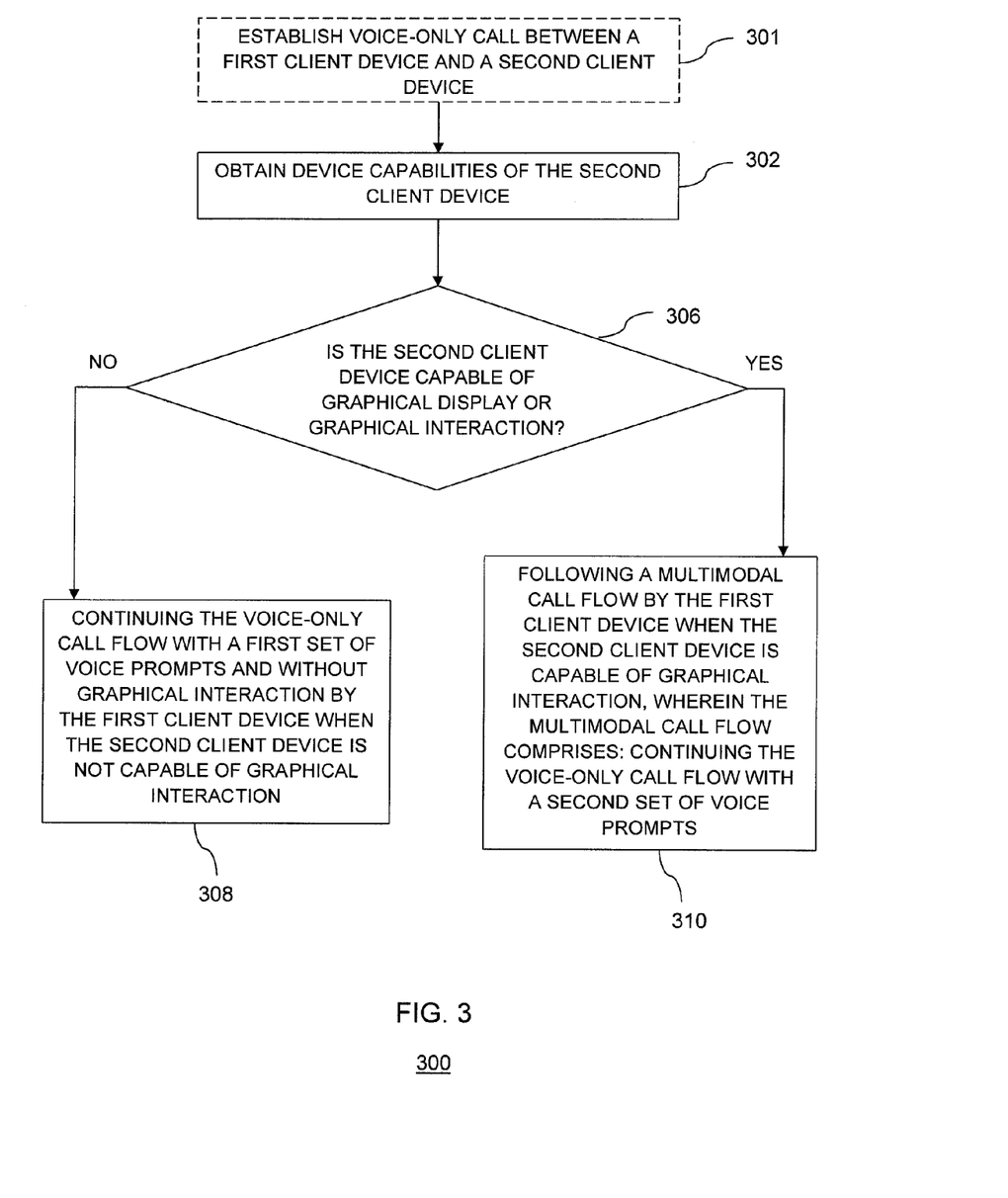
FIG. 3 is a flow diagram depicting an exemplary embodiment of a method for handling a call at a first client device in a packet network in accordance with one or more aspects of the invention.

FIG. 3 is a flow diagram depicting an exemplary embodiment of a method 300 for handling a call at a first client device in a packet network in accordance with one or more aspects of the invention. The method 300 begins at step 302, where the first client device obtains device capabilities of a second client device associated with the call. In one embodiment, the second client device is the calling device and the first client device is the called device (receiving device). Alternatively, the second client device may be the called device (receiving device) and the first client device may be the calling device. In either embodiment, the second client device may send the device capabilities to the first client device during call setup. Alternatively, at optional step 301, a call may be initially established between the first client device and the second client device as a voice-only call. In such an embodiment, the second client device may send the device capabilities to the first client device after the call has been established either through the second client device's own initiative or by request from the first client device.

At step 306, the device capabilities are processed to determine whether the second client device is capable of graphical display or graphical interaction. If not, the method 300 proceeds to step 308, where a voice-only call flow is followed. Otherwise, the method 300 proceeds to step 310, where a multimodal call flow is followed.

Figure 4:
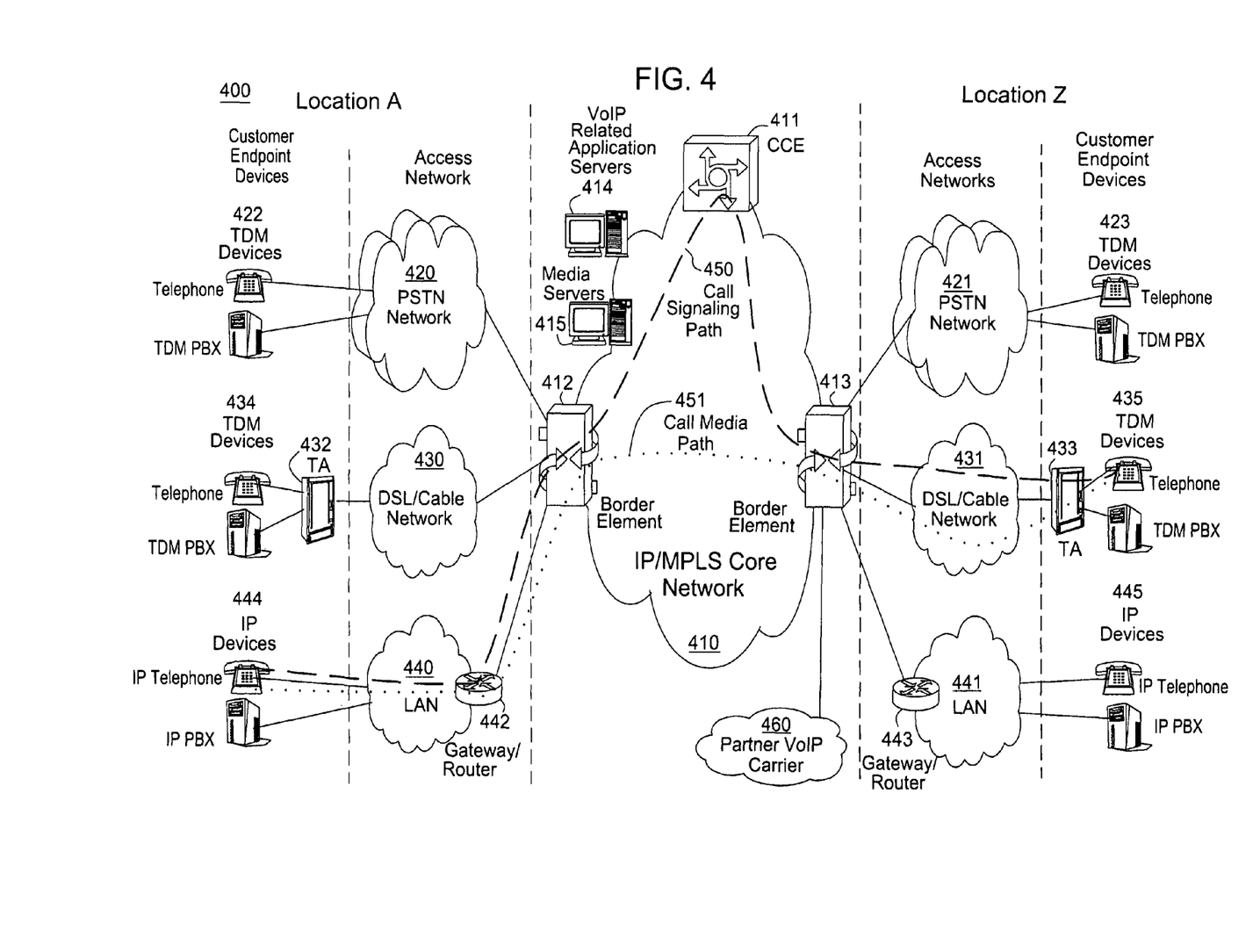
FIG. 4 is a block diagram depicting an exemplary embodiment of a VOIP communication system.

FIG. 4 is a block diagram depicting an exemplary embodiment of a VOIP communication system 400. The customer endpoint devices can be either Time Division Multiplexing (TDM) based or IP based. TDM based customer endpoint devices 422, 423, 434, and 435 typically comprise of TDM phones or Private Branch Exchange (PBX). IP based customer endpoint devices 444 and 445 typically comprise IP phones or IP PBX. The Terminal Adaptors (TA) 432 and 433 are used to provide necessary interworking functions between TDM customer endpoint devices, such as analog phones, and packet based access network technologies, such as Digital Subscriber Loop (DSL) or Cable broadband access networks. TDM based customer endpoint devices access VOIP services by using either a Public Switched Telephone Network (PSTN) 420, 421 or a broadband access network 430, 431 via a TA 432 or 433. IP based customer endpoint devices access VOIP services by using a Local Area Network (LAN) 440 and 441 with a VOIP gateway or router 442 and 443, respectively.

The access networks can be either TDM or packet based. A TDM PSTN 420 or 421 is used to support TDM customer endpoint devices connected via traditional phone lines. A packet based access network, such as Frame Relay, ATM, Ethernet or IP, is used to support IP based customer endpoint devices via a customer LAN, e.g., 440 with a VOIP gateway and router 442. A packet based access network 430 or 431, such as DSL or Cable, when used together with a TA 432 or 433, is used to support TDM based customer endpoint devices.

The core VOIP infrastructure comprises of several key VOIP components, such as the Border Elements (BEs) 412 and 413, the Call Control Element (CCE) 411, VOIP related Application Servers (AS) 414, and Media Servers (MS) 415. The BE resides at the edge of the VOIP core infrastructure and interfaces with customers endpoints over various types of access networks. A BE is typically implemented as a Media Gateway and performs signaling, media control, security, and call admission control and related functions. The CCE resides within the VOIP infrastructure and is connected to the BEs using the Session Initiation Protocol (SIP) over the underlying IP/MPLS based core backbone network 410. The CCE is typically implemented as a Media Gateway Controller or a softswitch and performs network wide call control related functions as well as interacts with the appropriate VOIP service related servers when necessary. The CCE functions as a SIP back-to-back user agent and is a signaling endpoint for all call legs between all BEs and the CCE. The CCE may need to interact with various VOIP related Application Servers (AS) in order to complete a call that require certain service specific features, e.g. translation of an E.164 voice network address into an IP address and so on.

For calls that originate or terminate in a different carrier, they can be handled through the PSTN 420 and 421 or the Partner IP Carrier 460 interconnections. For originating or terminating TDM calls, they can be handled via existing PSTN interconnections to the other carrier. For originating or terminating VOIP calls, they can be handled via the Partner IP carrier interface 460 to the other carrier.

In order to illustrate how the different components operate to support a VOIP call, the following call scenario is used to illustrate how a VOIP call is setup between two customer endpoints. A customer using IP device 444 at location A places a call to another customer at location Z using TDM device 435. During the call setup, a setup signaling message is sent from IP device 444, through the LAN 440, the VOIP Gateway/Router 442, and the associated packet based access network, to BE 412. BE 412 will then send a setup signaling message, such as a SIP-INVITE message if SIP is used, to CCE 411. CCE 411 looks at the called party information and queries the necessary VOIP service related application server 114 to obtain the information to complete this call. In one embodiment, the Application Server (AS) functions as a back-to-back user agent. If BE 413 needs to be involved in completing the call; CCE 411 sends another call setup message, such as a SIP-INVITE message if SIP is used, to BE 413. Upon receiving the call setup message, BE 413 forwards the call setup message, via broadband network 431, to TA 433. TA 433 then identifies the appropriate TDM device 435 and rings that device. Once the call is accepted at location Z by the called party, a call acknowledgement signaling message, such as a SIP 200 OK response message if SIP is used, is sent in the reverse direction back to the CCE 411. After the CCE 411 receives the call acknowledgement message, it will then send a call acknowledgement signaling message, such as a SIP 200 OK response message if SIP is used, toward the calling party. In addition, the CCE 411 also provides the necessary information of the call to both BE 412 and BE 413 so that the call data exchange can proceed directly between BE 412 and BE 413. The call signaling path 450 and the call media path 451 are illustratively shown in FIG. 4. Note that the call signaling path and the call media path are different because once a call has been setup up between two endpoints, the CCE 411 does not need to be in the data path for actual direct data exchange.

Media Servers (MS) 415 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 444 with packet based access network 440 can call another customer at location Z using TDM endpoint device 423 with PSTN access network 421. The BEs 412 and 413 are responsible for the necessary signaling protocol translation, e.g., SS7 to and from SIP, and media format conversion, such as TDM voice format to and from IP based packet voice format.

While the foregoing is directed to embodiments of the present invention, other and further embodiments of the invention may be devised without departing from the basic scope thereof, and the scope thereof is determined by the claims that follow.

The invention claimed is:

1. A method of handling a device capabilities announcement at a first client device in a packet network, comprising:
obtaining device capabilities of a second client device by the first client device from the second client device via the device capabilities announcement after a voice-only call flow between the first client device and the second client device has been established, wherein the first client device comprises an interactive voice response server, wherein the obtaining comprises receiving the device capabilities announcement via a first control channel parallel to the call, wherein the device capabilities announcement is received in a communication protocol message, wherein the device capabilities announcement comprises a portion of a capabilities announcement field in the communication protocol message;
processing the device capabilities announcement by the first client device to determine whether the second client device is capable of graphical interaction;
continuing the voice-only call flow with a first set of voice prompts and without graphical interaction by the first client device when the second client device is not capable of graphical interaction; and
following a multimodal call flow by the first client device when the second client device is capable of graphical interaction, wherein the multimodal call flow comprises:
continuing the voice-only call flow with a second set of voice prompts; and
sending image data towards the second client device for display by the second client device and receiving image data from the second client device for display by the first client device, wherein the image data further comprises an interactive form that solicits further information from a user of the first client device, wherein the image data is sent via a second control channel.

2. A first client device for handling a device capabilities announcement in a packet network, comprising:
a processor; and
a computer-readable medium storing instructions which, when executed by the processor, cause the processor to perform operations, the operations comprising:
obtaining device capabilities of a second client device from the second client device via the device capabilities announcement after a voice-only call flow between the first client device and the second client device has been established, wherein the first client device comprises an interactive voice response server, wherein the device capabilities announcement is received via a first control channel parallel to the call, wherein the device capabilities announcement is received in a communication protocol message, wherein the device capabilities announcement comprises a portion of a capabilities announcement field in the communication protocol message;
processing the device capabilities announcement to determine whether the second client device is capable of graphical interaction;
continuing the voice-only call flow with a first set of voice prompts and without graphical interaction by the first client device when the second client device is not capable of graphical interaction; and
following a multimodal call flow when the second client device is capable of graphical interaction, wherein the multimodal call flow comprises:
continuing the voice-only call flow with a second set of voice prompts; and
sending image data towards the second client device for display by the second client device and by receiving image data from the second client device for display, wherein the image data further comprises an interactive form that solicits further information from a user of the first client device, wherein the image data is sent via a second control channel.

3. A non-transitory computer-readable medium storing instructions that, when executed by a processor of a first client device, cause the processor to perform operations for handling a device capabilities announcement at the first client device in a packet network, the operations comprising:
- obtaining device capabilities of a second client device from the second client device via the device capabilities announcement after a voice-only call flow between the first client device and the second client device has been established, wherein the first client device comprises an interactive voice response server, wherein the obtaining comprises receiving the device capabilities announcement via a first control channel parallel to the call, wherein the device capabilities announcement comprises a portion of a capabilities announcement field in the communication protocol message;
- processing the device capabilities announcement to determine whether the second client device is capable of graphical interaction;
- continuing the voice-only call flow with a first set of voice prompts and without graphical interaction by the first client device when the second client device is not capable of graphical interaction; and
- following a multimodal call flow when the second client device is capable of graphical interaction, wherein the multimodal call flow comprises:
  - continuing the voice-only call flow with a second set of voice prompts; and
  - sending image data towards the second client device for display by the second client device and receiving image data from the second client device for display by the first client device, wherein the image data further comprises an interactive form that solicits further information from a user of the first client device, wherein the image data is sent via a second control channel.

* * * * *